(12) United States Patent
Beck et al.

(10) Patent No.: US 10,591,165 B2
(45) Date of Patent: Mar. 17, 2020

(54) FUEL NOZZLE BODY

(71) Applicant: Siemens Aktiengesellschaft, Munich (DE)

(72) Inventors: Christian Beck, Essen (DE); Andreas Böttcher, Mettmann (DE); Christopher Grandt, Essen (DE); Thomas Hauser, Strausberg (DE); Patrick Lapp, Berlin (DE); Stefan Reich, Düsseldorf (DE)

(73) Assignee: Siemens Aktiengesellschaft, Munich (DE)

( * ) Notice: Subject to any disclaimer, the term of this patent is extended or adjusted under 35 U.S.C. 154(b) by 411 days.

(21) Appl. No.: 15/503,993

(22) PCT Filed: Oct. 8, 2015

(86) PCT No.: PCT/EP2015/073283
§ 371 (c)(1),
(2) Date: Feb. 14, 2017

(87) PCT Pub. No.: WO2016/058903
PCT Pub. Date: Apr. 21, 2016

(65) Prior Publication Data
US 2017/0276370 A1    Sep. 28, 2017

(30) Foreign Application Priority Data
Oct. 13, 2014  (DE) .......................... 10 2014 220 689

(51) Int. Cl.
*F23R 3/36*    (2006.01)
*F23D 17/00*   (2006.01)
(Continued)

(52) U.S. Cl.
CPC ................. *F23R 3/36* (2013.01); *F02C 3/04* (2013.01); *F23D 17/002* (2013.01); *F23R 3/286* (2013.01);
(Continued)

(58) Field of Classification Search
CPC .... F23R 3/36; F23R 3/286; F02C 9/40; F23D 2211/00
See application file for complete search history.

(56) References Cited

U.S. PATENT DOCUMENTS 4,902,091 A   2/1990  Althaus et al.
5,410,884 A   5/1995  Fukue et al.
(Continued)

FOREIGN PATENT DOCUMENTS

CN    200958753 Y    10/2007
CN    103032892 A     4/2013
(Continued)

OTHER PUBLICATIONS

CN search report dated Jun. 21, 2018, for CN patent application No. 201580031080.X.
(Continued)

*Primary Examiner* — Todd E Manahan
*Assistant Examiner* — Katheryn A Malatek
(74) *Attorney, Agent, or Firm* — Beusse Wolter Sanks & Maire

(57) ABSTRACT

A fuel nozzle body having a rearward end and a front end with an outer tube which extends from the rearward end to the front end and has radial openings for a first fuel in the region of the front end, and an inner tube which is arranged concentrically to the outer tube and which opens in the region of the front end into a nozzle head, which has additional openings for a second fuel, wherein, in the region of the front end, the inner tube is guided in the outer tube by two fits which are arranged axially between the radial openings and the additional openings, and wherein the first fit closest to the radial openings is configured as a circum-
(Continued)

ferential web around the inner tube, and wherein the second fit is configured with at least one interruption on the perimeter.

12 Claims, 4 Drawing Sheets

(51) Int. Cl.
 *F23R 3/28* (2006.01)
 *F02C 3/04* (2006.01)
 *F02C 9/40* (2006.01)
(52) U.S. Cl.
 CPC ............ *F02C 9/40* (2013.01); *F23D 2211/00* (2013.01); *F23D 2900/00008* (2013.01); *F23R 2900/00005* (2013.01)

(56) References Cited

U.S. PATENT DOCUMENTS

| | | | |
|---|---|---|---|
| 5,487,659 A * | 1/1996 | Eroglu | F23D 11/101 431/12 |
| 5,615,555 A | 4/1997 | Mina | |
| 6,402,059 B1 * | 6/2002 | Benz | F23D 11/101 239/422 |
| 8,869,534 B2 | 10/2014 | Boeettcher et al. | |
| 2004/0129001 A1 | 7/2004 | Lehtinen | |
| 2010/0319353 A1 | 12/2010 | Intile | |
| 2012/0055162 A1 * | 3/2012 | Eroglu | F23D 17/002 60/740 |
| 2013/0031907 A1 | 2/2013 | Woerz et al. | |
| 2013/0084534 A1 | 4/2013 | Melton et al. | |

FOREIGN PATENT DOCUMENTS

| | | |
|---|---|---|
| DE | 249612 A3 | 9/1987 |
| EP | 0337141 A1 | 10/1989 |
| JP | S61223418 A | 10/1986 |
| JP | 2000039147 A | 2/2000 |
| WO | 9919670 A2 | 4/1999 |

OTHER PUBLICATIONS

DE Search Report for DE patent application No. 102014220689.8.
International Search Report dated Jan. 18, 2016, for PCT application No. PCT/EP2015/073283.
IPPR (PCT/IPEA/416 and 409) dated Sep. 21, 2016, for PCT application No. PCT/EP2015/073283.

* cited by examiner

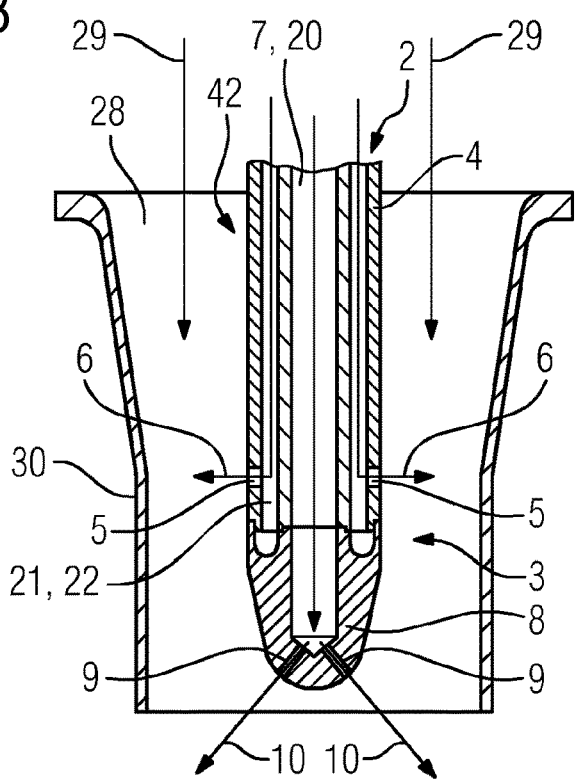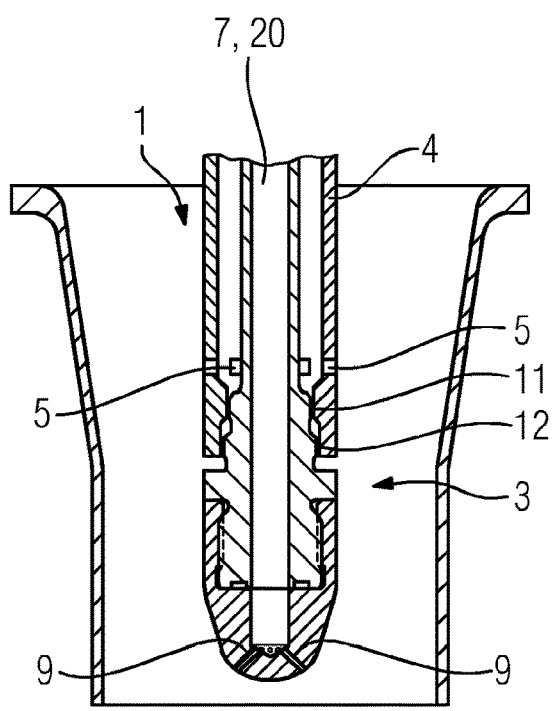

FUEL NOZZLE BODY

CROSS REFERENCE TO RELATED APPLICATIONS

This application is the US National Stage of International Application No. PCT/EP2015/073283 filed Oct. 8, 2015, and claims the benefit thereof. The International Application claims the benefit of German Application No. DE 102014220689.8 filed Oct. 13, 2014. All of the applications are incorporated by reference herein in their entirety.

FIELD OF INVENTION

The invention relates to a fuel nozzle body, in particular for a burner of a gas turbine, and relates to the compensation of thermal expansions. The invention furthermore relates to a burner and to a gas turbine.

BACKGROUND OF INVENTION

A fuel nozzle or fuel nozzle body for gas and oil operation is exposed to different temperatures, depending on the operating mode, for which reason measures for thermal compensation are necessary. One such measure is the attachment of a bellows compensator at a suitable location, but this is often impossible to implement for reasons of space and, even if it can be, it is relatively expensive.

SUMMARY OF INVENTION

It is therefore the object of the invention to specify a fuel nozzle body with which the problem of thermal compensation is solved at low cost. Further objects of the invention are the disclosures of a corresponding burner and of a corresponding gas turbine.

The object as it relates to the fuel nozzle body is achieved by the disclosure of a fuel nozzle body as claimed. The object as it relates to the burner is achieved by the disclosure of a burner as claimed. The object as it relates to the gas turbine is achieved by the disclosure of a gas turbine as claimed. The dependent claims contain advantageous embodiments of the invention.

According to the invention, the fuel nozzle body having a rearward end and a forward end comprises an outer tube, which extends from the rearward end to the forward end and has radial openings for a first fuel in the region of the forward end, and an inner tube, which is arranged concentrically with respect to the outer tube and which opens in the region of the forward end into a nozzle head, which has additional openings for a second fuel, wherein, in the region of the forward end, the inner tube is guided in the outer tube by two fits, which are arranged axially between the radial openings and the additional openings.

Thus, the fuel nozzle body is embodied with a self-regulating compensation unit. The inner tube is supported slidably in the outer tube, which forms an annular channel with the inner tube, and is designed in such a way that it can compensate the maximum thermal expansions of the two systems.

The inventive fuel nozzle body is characterized by two fits.

The first fit, which is closest to the radial openings, is embodied as a web encircling the inner tube. This shape is simple and effective.

To enable the fuel allowed through the first fit to be discharged into the combustion chamber, the second fit is, according to the invention, embodied with at least one interruption on the circumference, i.e. is embodied in a star shape for example, with the result that the second fit does not rest on the inside of the outer tube over the entire circumference but only in individual segments, or is embodied as an encircling web, similarly to the first fit, but with interruptions. In the regions which are left open, the "leakage fuel" can flow reliably past the second fit and into the combustion chamber.

In an advantageous embodiment of the invention, the first fit has stricter fit requirements than the second fit. In particular, a gap which is larger but a closer fit in comparison with the second fit is defined for the first fit (or leakage fit), said gap thus allowing a relatively large amount of leakage (e.g. up to 5%, based on available injection holes) but a scatter of only <1% across all injectors. In this way, it is possible to ensure the minimum effect on the gas/air mixture.

In another advantageous embodiment, the second fit has a narrower gap than the first fit. The narrower gap in the second fit has the effect that abrasion, in the region of the first fit, i.e. the leakage fit, which would otherwise be expected, is avoided. In this way, a leakage fit which is as far as possible permanently stable over the entire time in operation is ensured since the first fit is never in contact with the outer tube and an annular gap is thus always achieved.

To ensure that the two tubes can always be guided in an optimum manner one inside the other, it is furthermore advantageous if the second fit is chrome-plated.

As an alternative, it can be advantageous if the second fit is hardened, the second fit thus having a greater hardness at its surface than its substrate material.

As regards the nozzle head, it is advantageous if it is detachably connected to the inner tube. This allows simpler and less expensive exchange during servicing work.

In an advantageous embodiment, the inner tube projects from the outer tube in the region of the forward end, and an encircling web is arranged on that part of the inner tube which projects from the outer tube.

This web can be used as an abutment for the nozzle head.

As an alternative, however, a web of this kind can serve as a retainer for the inner tube in combination with a sleeve which is detachably connected at its first end to the forward end of the outer tube and, at its second end, engages behind the encircling web of the inner tube by means of a radially inward-oriented flange.

It is expedient here if the sleeve is embodied in a manner optimized in terms of flow.

The inner tube is advantageously an oil line and is used to supply the nozzle head.

As a further advantage, the annular channel formed by the inner and the outer tube is a gas line.

A burner according to the invention, which can be a gas turbine burner, in particular, is fitted with a fuel nozzle body according to the invention.

It is advantageous if a gas turbine having a compressor, a turbine and a combustion chamber comprises a burner of this kind.

BRIEF DESCRIPTION OF THE DRAWINGS

Further features, characteristics and advantages of the present invention will become apparent from the following description of illustrative embodiments with reference to the attached figures.

FIG. 3 shows a fuel nozzle body with oil and gas injection in accordance with the prior art without a thermal compensation function, FIG. 4 shows a fuel nozzle body with oil and gas injection according to the invention with a thermal compensation function.

DETAILED DESCRIPTION OF INVENTION

Figure 1:
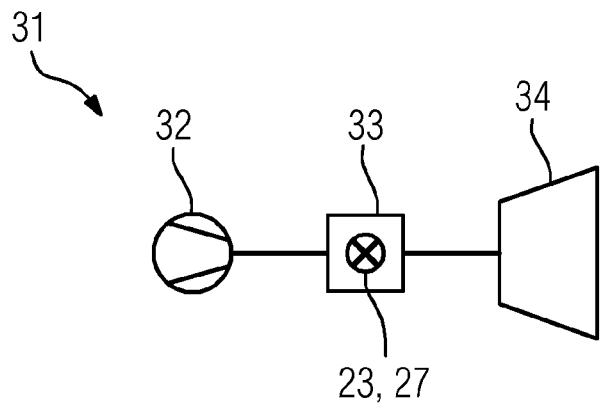
FIG. 1 shows the schematic diagram of a gas turbine.

FIG. 1 shows a gas turbine 31 schematically. This comprises a compressor section 32, a combustion chamber section 33 and a turbine section 34 as well as a combustion chamber 27 having at least one burner 23 in the region of the combustion chamber section 33. A burner 23 of this kind is described in greater detail in FIG. 2. The burner 23 has a fuel nozzle body 1, which is described in greater detail in FIGS. 3 to 10.

During the operation of the gas turbine 31, air is drawn in through an air inlet of the compressor section 32 and is compressed there. The compressed air is fed to the combustion chambers 27, which are arranged in the combustion chamber section 33. A gaseous or liquid fuel, e.g. gas or oil, is also injected into the combustion chambers 27 via burners 23 or fuel nozzles. Here, fuel nozzle bodies comprise fuel nozzles/openings for liquid and gaseous fuels. The air/fuel mixture which forms is ignited and burned in the combustion chambers 27. The hot combustion exhaust gases flow from the combustion chamber section 33 into the turbine section 34, where they expand and cool down.

Figure 2:
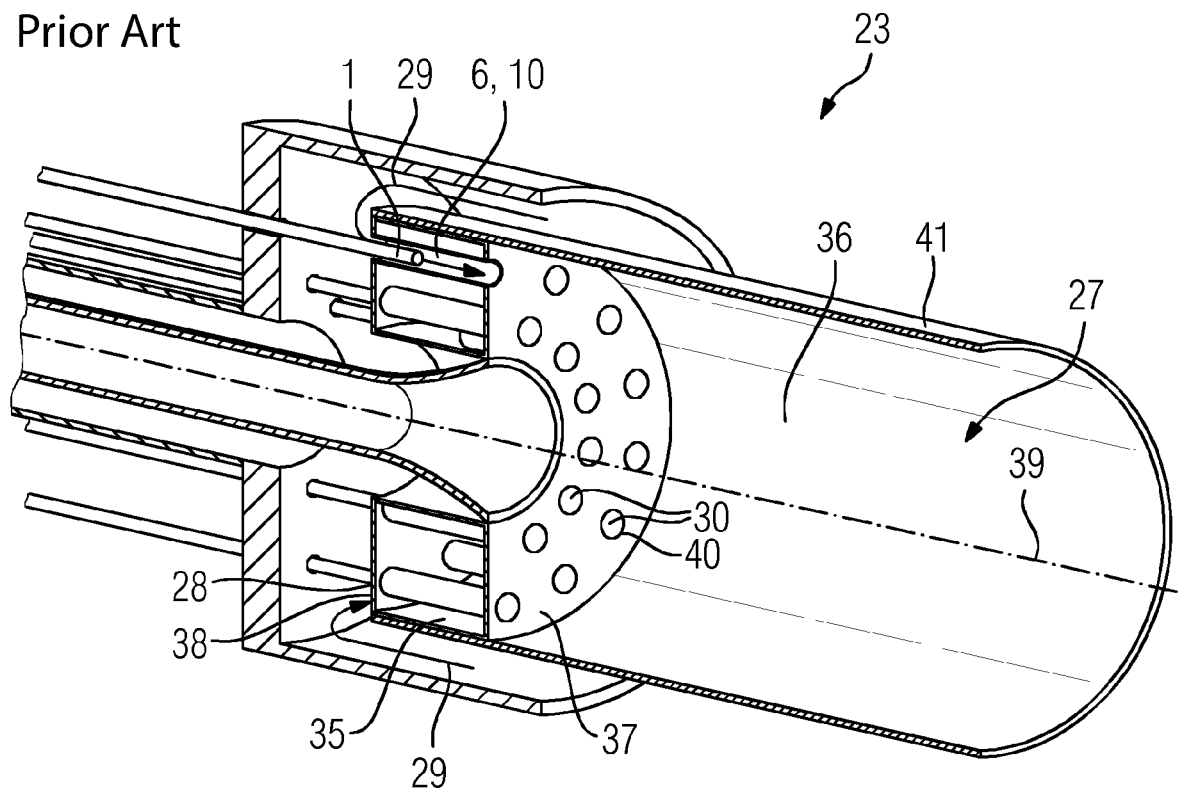
FIG. 2 shows the view of a jet burner.

FIG. 2 shows, schematically and by way of example, a burner 23, in particular a jet burner, in section with a "nozzle support" 35. The nozzle support 35 comprises a hot side 37, which faces a combustion zone 36 during operation, and an opposite cold side 38, which faces away from the combustion zone 36, wherein premixing tubes 30 in the nozzle support 35 extend from the cold side 38 to the hot side 37, i.e. parallel to the main axis 39 of the burner 23, each having an inlet 28 facing a premixing section on the cold side 38 and an outlet 40 on the hot side 37.

The premixing tubes 30 serve as jet nozzles, which, in the current example, are arranged on two circles and at the inlets 28 of which fuel nozzle bodies 1 are arranged. During operation, a fuel 6, 10 and compressor air 29 flow through the jet nozzles, i.e. the premixing tubes 30, and enter the combustion chamber 27, delimited by a shell 41, as a fuel/air mixture at the outlets 40 of the jet nozzles.

FIG. 3 shows, schematically and by way of example, a fuel nozzle body 42 with oil and gas injection in accordance with the prior art. The fuel nozzle body 42 has a rearward end 2 for feeding fuel to the fuel nozzle body 42 and a forward end 3 having openings 5, 9 assigned to different fuels. In particular, the fuel nozzle body 42 comprises an outer tube 4, which extends from the rearward end 2 to the forward end 3 and has radial openings 5 for a first fuel 6 in the region of the forward end 3, and an inner tube 7, which is arranged concentrically with respect to the outer tube 4 and which opens in the region of the forward end 3 into a nozzle head 8, which has additional openings 9 for a second fuel 10. The fuel nozzle body 42 is arranged at the inlet 28 of a premixing section. During operation, compressed air 29 flows past the fuel nozzle body 42 into a premixing tube 30. In the gas mode, gaseous fuel 6 is passed through the annular channel 21 formed by the inner 7 and the outer tube 4 and is injected into the air stream 29 surrounding the fuel nozzle body 42 via the radial openings 5. In the oil mode, oil is fed into the surrounding air stream 29 via the inner tube 7 and the nozzle head 8 having the additional openings 9 for injecting oil 10. The annular channel 21 thus acts as a gas line 22, and the inner tube 7 acts as an oil line 20.

FIG. 4 shows a fuel nozzle body 1 according to the invention having a thermal compensation function, which is characterized in that, in the region of the forward end 3, the inner tube 7 is guided in the outer tube 4 by two fits 11, 12, which are arranged axially between the radial openings 5 and the additional openings 9.

Figure 5:
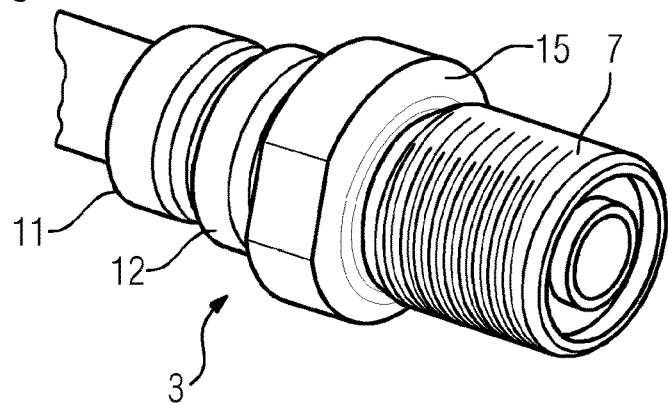
FIG. 5 shows an inner tube in the region of the forward end in perspective view.
Figure 6:
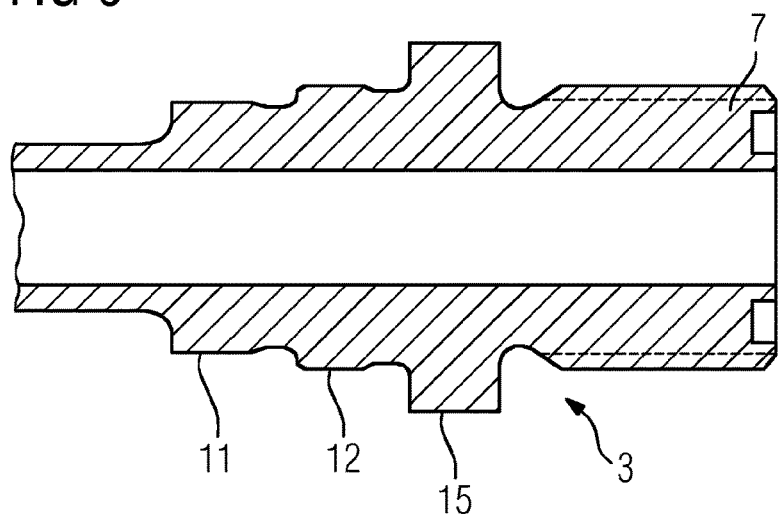
FIG. 6 shows an inner tube in the region of the forward end in section.
Figure 7:
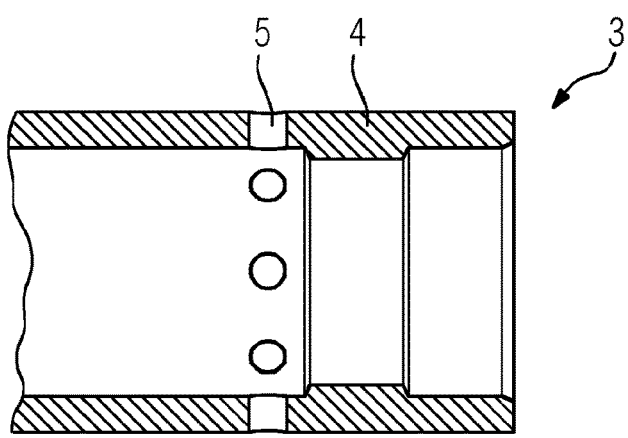
FIG. 7 shows an outer tube in the region of the forward end in section.

FIGS. 5 and 6 show the inner tube 7 in the region of the forward end 3 in a perspective view and in section. It shows the first fit 11, the second fit 12 and an encircling web 15. FIG. 7 shows the "mating part", the outer tube 4 with the radial openings 5 for the first fuel 6.

Figure 8:
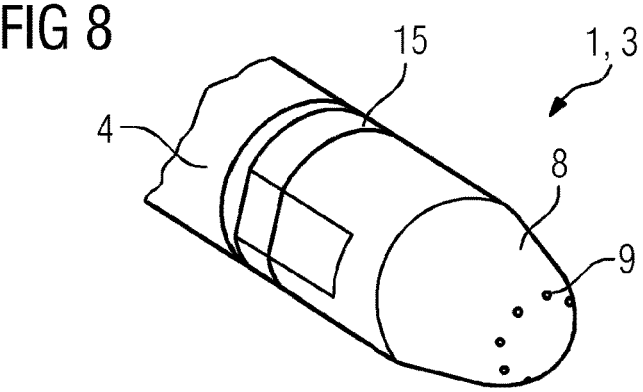
FIG. 8 shows the forward end of the fuel nozzle body in perspective view.
Figure 9:
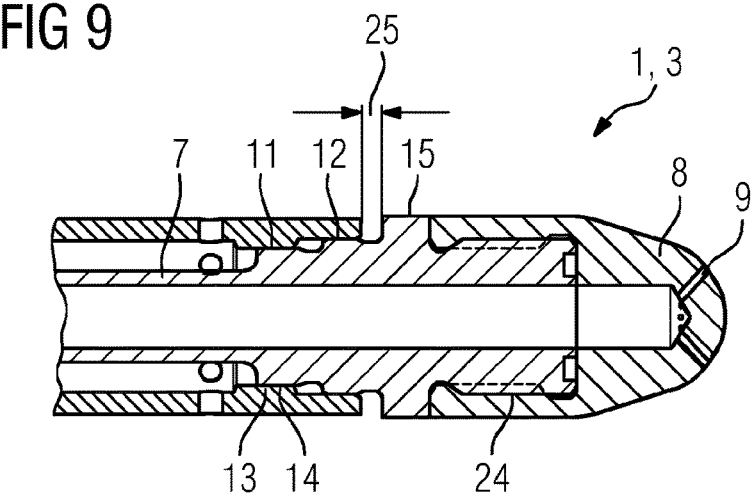
FIG. 9 shows the forward end of the fuel nozzle body in section.

FIGS. 8 and 9 show the forward end 3 of the fuel nozzle body 1 in a perspective view and in section.

FIG. 8 essentially shows the outer tube 4, a web 15 of the inner tube 7 and the nozzle head 8 with the additional openings 9 for the additional fuel 10.

FIG. 9 shows that the nozzle head 8 is detachably connected to the inner tube 7, being screwed to it in the example shown (see screwed joint 24). The gap seal 14 of the first fit 11 is embodied in such a way that there is a minimal controlled leakage during operation. In particular, there should be less than 5% leakage via the first fit 11, based on the total injection zone. The second fit 12 is designed in such a way that it ensures a closer fit in all load cases than the first fit 11, also referred to as a leakage fit, and hence no contact arises between the first fit 11 and the inside of the outer tube 4, with the result that the leakage is defined by means of the first fit 11. In particular, the second fit 12 is more closely toleranced than the first fit 11. To make this work, fit 12 must not make contact with the entire circumference as an encircling web 13, like fit 11. For this reason, the second fit 12 is embodied in a star shape (not visible in the sectional drawing in FIG. 9 but visible in the embodiment in FIG. 10).

FIG. 9 furthermore shows that the inner tube 7 projects from the outer tube 4 in the region of the forward end 3. The encircling web 15 arranged on the part of the inner tube 7 which projects from the outer tube 4 can also be seen in FIG. 8. This web 15 can be used as an abutment for the nozzle head 8. FIG. 9 shows the expansion distance 25 between the forward end of the outer tube 4 and the web 15.

Figure 10:
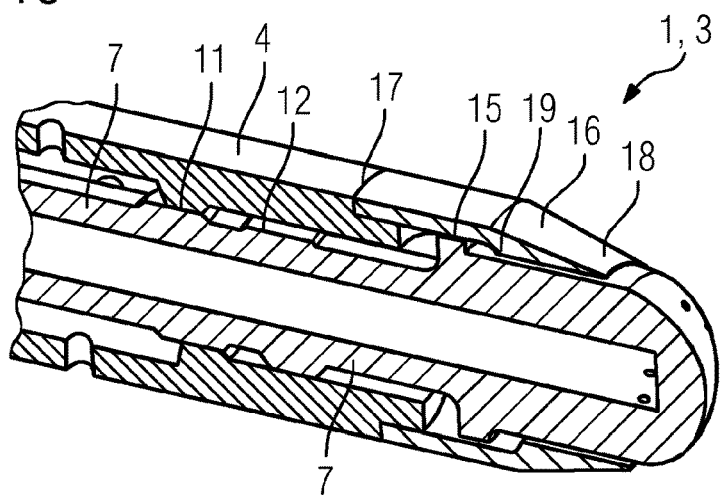
FIG. 10 shows the forward end of the fuel nozzle body with retention sleeve.

FIG. 10 shows an alternative use for the web 15. In this case, a sleeve 16 is detachably connected, e.g. screwed, at its first end 17 to the forward end 3 of the outer tube 4. At its second end 18, the sleeve 16 engages behind the encircling web 15 of the inner tube 7 by means of a radially inward-oriented flange 19. The sleeve 16 is intended to prevent loss of the inner tube 7. FIG. 10 furthermore shows that the sleeve 16 is embodied in a manner optimized in terms of flow and tapers toward the forward end 3.

The invention claimed is:

1. A fuel nozzle body comprising:
a rearward end and a forward end, comprising an outer tube, which extends from the rearward end to the forward end and has radial openings for a first fuel in a region of the forward end, and an inner tube, which is arranged concentrically with respect to the outer tube and which opens in the region of the forward end into a nozzle head, which has additional openings for a second fuel, wherein, in the region of the forward end, the inner tube is guided in the outer tube by two fits, which are arranged axially between the radial openings and the additional openings, wherein a first fit of the two fits comprises a leakage seal between a first surface feature of the inner tube and a first surface feature on the outer tube encircling the first surface feature of the inner tube, wherein a second fit of the two fits comprises a second surface feature of the inner tube and a second surface feature on the outer tube encircling the second surface feature of the inner tube, wherein the second surface feature of the inner tube comprises at least one interruption, and wherein the first fit is closer to the radial openings than the second fit.

2. The fuel nozzle body as claimed in claim 1,
wherein the first fit comprises a first gap between the first surface feature of the inner tube and the first surface feature on the outer tube, wherein the second fit comprises a second gap between the second surface feature of the inner tube and the second surface feature on the outer tube, and wherein the second gap is narrower than the first gap.

3. The fuel nozzle body as claimed in claim 1,
wherein at least one of the second surface feature of the inner tube and the second surface feature on the outer tube of the second fit is chrome-plated.

4. The fuel nozzle body as claimed in claim 1,
wherein at least one of the second surface feature of the inner tube and the second surface feature on the outer tube of the second fit is hardened.

5. The fuel nozzle body as claimed in claim 1,
wherein the nozzle head is detachably connected to the inner tube.

6. The fuel nozzle body as claimed in claim 1,
wherein the inner tube projects from the outer tube in the region of the forward end, and an encircling web is arranged on that part of the inner tube which projects from the outer tube.

7. The fuel nozzle body as claimed in claim 1,
wherein the inner tube further comprises an encircling web disposed between the second fit and the additional openings,
wherein the fuel nozzle body further comprises a sleeve comprising a sleeve first end which is detachable connected the forward end of the outer tube and a sleeve second end that comprises a radially inward-oriented flange that engages the inner tube between the encircling web and the additional openings.

8. The fuel nozzle body as claimed in claim 7,
wherein the sleeve tapers radially inward toward the sleeve second end.

9. The fuel nozzle body as claimed in claim 1,
wherein the inner tube is an oil line.

10. The fuel nozzle body as claimed in claim 1,
wherein an annular channel formed between the inner and the outer tube is a gas line.

11. A burner comprising:
the fuel nozzle body as claimed in claim 1.

12. A gas turbine comprising:
a compressor,
a turbine, and
a combustion chamber having at least one burner as claimed in claim 11.

* * * * *